Sept. 7, 1937.  A. C. FUHRMAN  2,092,113
FIFTH WHEEL
Filed Oct. 7, 1935   2 Sheets-Sheet 1
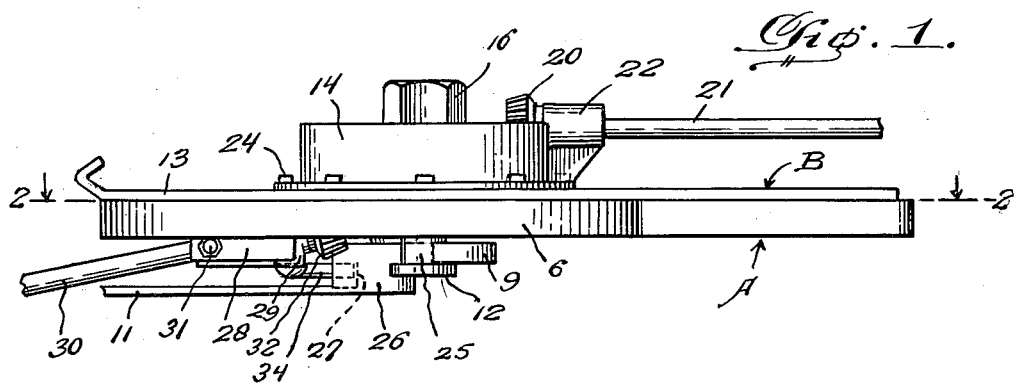
Fig. 1.
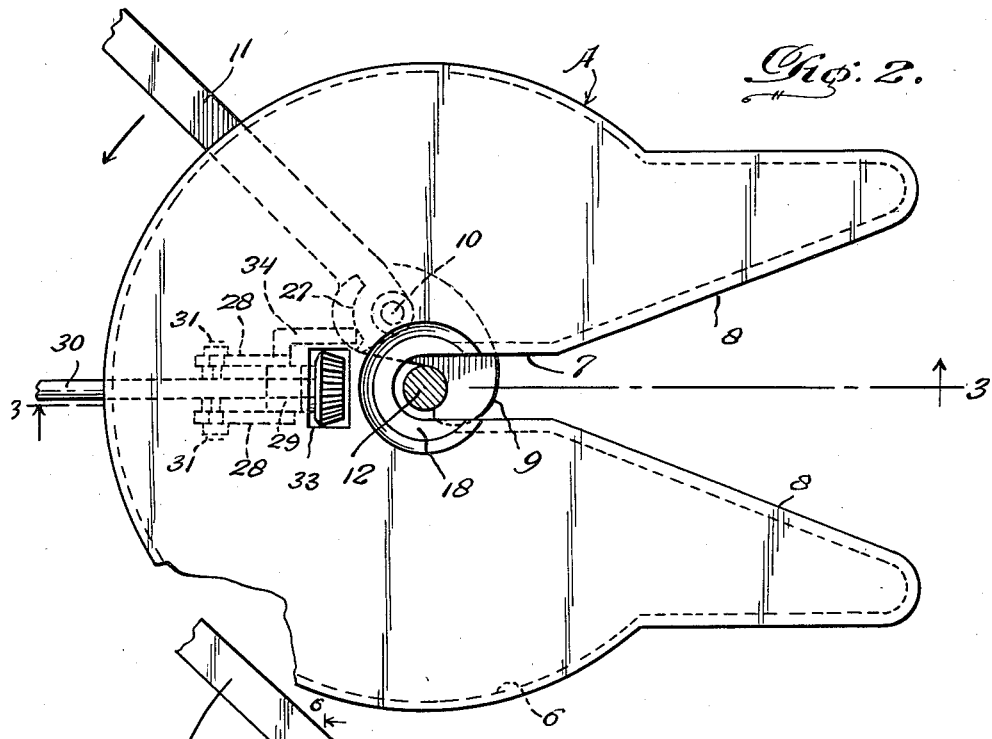
Fig. 2.
Fig. 3.
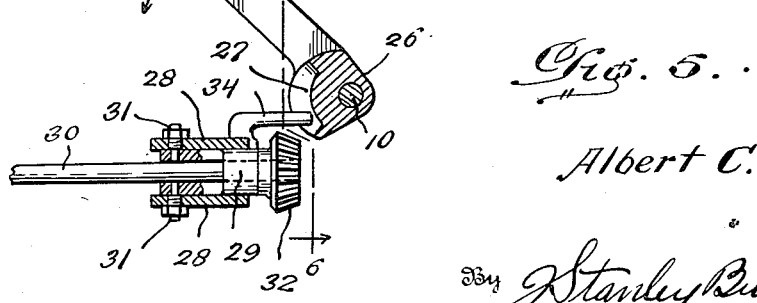
Inventor
Albert C. Fuhrman,
By Stanley Burch
Attorney Sept. 7, 1937.          A. C. FUHRMAN          2,092,113
                         FIFTH WHEEL
              Filed Oct. 7, 1935       2 Sheets-Sheet 2
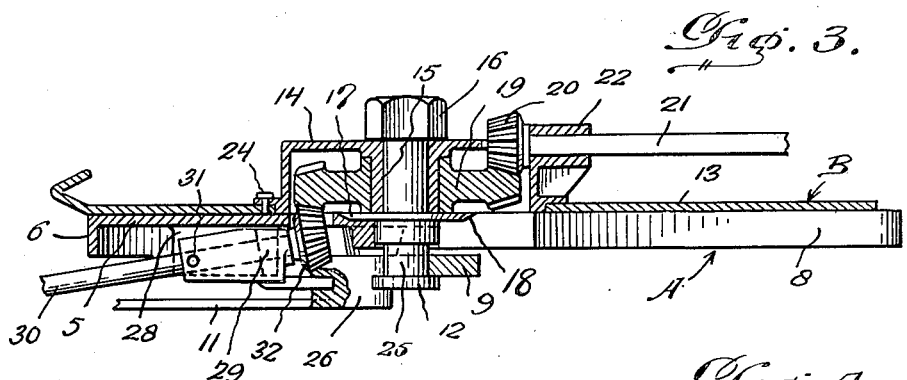
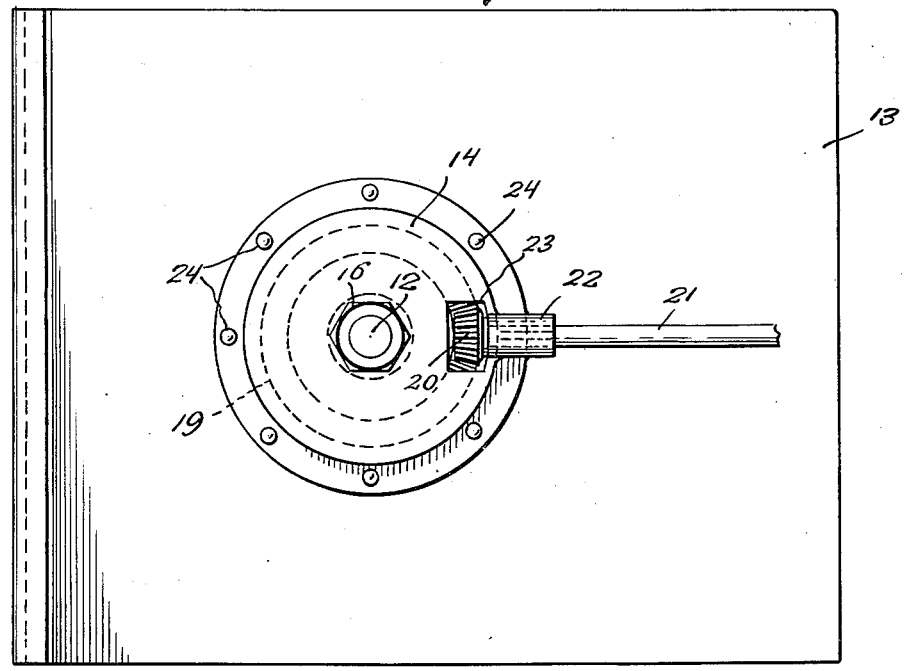
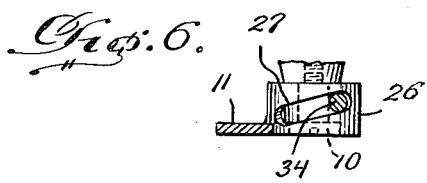
Inventor
Albert C. Fuhrman
By J. Stanley Burch
Attorney Patented Sept. 7, 1937

2,092,113

UNITED STATES PATENT OFFICE 2,092,113

FIFTH WHEEL

Albert C. Fuhrman, Canton, Ohio

Application October 7, 1935, Serial No. 43,973

6 Claims. (Cl. 180—14)

This invention relates to improvements in fifth wheels for detachably and pivotally coupling the semi-trailer to the motor tractor unit of a motor vehicle.

The primary object of the present invention is to provide an improved fifth wheel of the above kind having means for transmitting power from the motor tractor unit to a power hoist or other instrumentality on the semi-trailer, and without interfering with the pivotal action of the fifth wheel or the use thereof in the operation of coupling or uncoupling the semi-trailer to or from the motor tractor unit.

A more particular object of the present invention is to provide a fifth wheel construction of the above kind which is extremely simple and durable in construction, efficient in use, and economical to manufacture.

Other objects and features of the present invention will become apparent from the following description when considered in connection with the accompanying drawings, in which:

Figure 1 is a side elevational view of a fifth wheel embodying the present invention.

Figure 2 is a horizontal section on line 2—2 of Figure 1.

Figure 3 is a vertical section of the construction shown in Figure 1, taken on the plane of line 3—3 of Figure 2.

Figure 4 is a top plan view of that part of the fifth wheel shown in Figure 1, which is carried by the semi-trailer.

Figure 5 is a fragmentary view, partly in horizontal section, showing details of the means for operatively connecting the coupling lever of the fifth wheel with a pinion of the power transmitting means for shifting the same into and out of engagement with a gear of such means, so that the latter will not interfere with the coupling or uncoupling operation, and so that said power transmitting means will be rendered operative after the coupling operation; and Figure 6 is a fragmentary section on line 6—6 of Figure 5.

As is usual in fifth wheels of the present type, the present invention includes two parts A and B, respectively adapted to be suitably mounted on and carried by the motor tractor unit and the semi-trailer. The part A consists of the usual supporting plate 5 having a depending marginal flange 6 and provided with a longitudinally extending slot 7 which is open at its rear end in communication with a throat 8. A coupling member or hook 9 is pivoted at 10 to the under side of plate 5 adjacent and at one side of the inner end of slot 7 for swinging movement in a plane parallel with that of the plate 5, and this coupling member is provided with a rigid operating handle or lever 11 that projects laterally and forwardly beyond the plate 5, as shown. The arrangement is such that, by swinging the lever 11 in one direction, the coupling member 9 will be swung to a position wherein the same extends across the slot 7 as shown in Figure 2, to engage behind the king pin 12 of the part B and releasably retain it in the inner or forward end portion of slot 7 so as to couple the semi-trailer to the motor tractor unit. By swinging the lever 11 in the opposite direction, the coupling member 9 may be disengaged from the king pin 12 by swinging said coupling member clear of or to one side of slot 11, thereby permitting the king pin 12 to pass rearwardly from slot 7 and throat 8 to effect uncoupling of the semi-trailer from the motor tractor unit. Thus far described, the construction and operation is generally old and well known in the art.

The part B of the fifth wheel includes a plate 13 adapted to rest upon the plate 5 of part A when said parts are in coupled relation, as shown in Figures 1 and 3. In accordance with the present invention, the plate 13 has a substantially central circular raised portion 14, and this raised portion has a central depending tubular boss 15 which receives the upper portion of the king pin 12 and in which the latter is rigidly secured by suitable means, such as a nut 16 threaded upon the extreme upper end portion of king pin 12 and into engagement with the top wall of raised portion 14, said king pin 12 having an annular flange 17 abutting the lower end of boss 15 and adapted to seat in a circular recess 18 provided in the upper surface of plate 5 of part A. A gear 19 is journaled on the boss 15 within the raised portion or gear box 14, so that all portions of such gear are disposed above the plane of the lower face of plate 13. The gear 19 is preferably of the bevel type having teeth on opposite sides of the margin thereof, and constantly meshing with the teeth on the upper side of this gear 19 is a pinion 20 secured on the forward end of a shaft 21 arranged substantially parallel with the plate 13, journaled in a bearing 22 carried by the rear side of raised portion or gear box 14, and extending rearwardly for suitable operative connection with the hoisting apparatus or other instrumentality on the semi-trailer to be actuated. The raised portion or gear box 14 is preferably just deep enough to accommodate the gear 19, in which case the top of the raised portion 14 will be provided with a slot 23 through which the upper portion of pinion 20 projects. As shown, the plate 13 and raised portion 14 are two separate parts, the plate 13 having a circular opening over which the raised portion 14 is fastened in any suitable manner, as by riveting the outwardly flanged bottom of raised portion 14 to the plate 13 about the opening in the latter as at 24. Obviously, the gear 19 may freely rotate about the boss 15 without interfering with turning of the king pin 12 in the inner end of slot 7 of plate 5, the axis of said gear 19 being concident with the axis of king pin 12. It will be noted that the lower end of king pin 12 has an annular groove 25 in which the coupling member or hook 9 is adapted to engage so as to prevent upward separation of part B from part A when the said parts of the fifth wheel are coupled together. For a purpose which will be presently described, the coupling member or hook 9 has a relatively wide or thick hub 26 formed with an inclined peripheral slot or groove 27.

Rigid with and depending from the plate 5 of the part A directly forwardly of the slot 7 are spaced parallel and longitudinally extending guide flanges 28, and pivotally mounted for vertical swinging movement between these guide flanges 28 is a bearing member 29 in which is journaled a shaft 30 that extends forwardly for suitable operative connection with the power take-off usually provided on the transmission of an ordinary motor tractor unit. The pivotal connection of bearing member 29 with flanges 28 is located at the forward ends thereof as shown at 31, and secured on the rear end of shaft 30 is a pinion 32 arranged to be engaged with the teeth on the under side of gear 19 when the parts of the fifth wheel are coupled together. The arrangement is such, however, that the bearing member 29 may be swung vertically so as to correspondingly shift the shaft 30 and pinion 32, upward movement of said pinion 32 causing it to move into engagement with the gear 19, and downward movement of said pinion 32 causing its disengagement from said gear 19. The upward movement of pinion 32 causes it to assume a position wherein the same projects above the plane of the lower surface of plate 13 where it would interfere with the uncoupling of the parts A and B, and it is for this reason that provision is made for lowering pinion 32 out of engagement with gear 19 and below the plane of the lower face of plate 13, so that uncoupling of the parts A and B may be effected without interference or injury or destruction of parts. It will of course be readily seen that shifting of pinion 32 for only a very short distance will be required, thereby avoiding any possibility of defect in the operation of the means for transmitting power from the tractor unit to the semi-trailer. The plate 5 of part A has a suitable slot 33 through which the pinion 32 may be projected or shifted into engagement with the gear 19.

While the shifting of pinion 32 may be effected in any preferred manner, it is desirable to provide means for operatively connecting the bearing member 29 with the coupling member 9 so that when the latter is swung to coupling position the pinion 32 if raised into engagement with gear 19, and so that when coupling member 9 is swung to released or uncoupling position the pinion 32 will be lowered out of engagement with gear 19. For the latter purpose, the bearing member 29 preferably has a rigid pin 34 that projects rearwardly into the inclined slot or groove 27 of the hub 26 of coupling member 9, the slot or groove 27 being inclined in such a direction and to such a degree as to cause the shifting of pinion 32 in the manner described. In other words, shifting of lever 11 in the direction of the arrow in Figure 2 will simultaneously cause release of coupling member 9 and lowering of pinion 32 out of engagement with gear 19 by reason of the action of slot 27 on pin 34, while movement of lever 11 in the opposite direction will cause shifting of coupling member 9 to the operative position of Figure 2 and will simultaneously cause raising of pinion 32 into engagement with gear 19.

From the foregoing description, it is believed that the operation of the present invention will be apparent to those skilled in the art. In other words, when the parts of the fifth wheel are coupled together, rotation of shaft 30 will be transmitted to shaft 21 through pinion 32, gear 19 and pinion 20, and, due to the connection of shaft 30 with the power take-off of the tractor unit and the connection of shaft 21 to the hoisting device or other instrumentality on the semi-trailer to be operated, the desired power actuation of said apparatus or instrumentality will be had. It will be seen that the construction is very simple, compact and durable, as well as so constituted as to insure efficient operation and prevent little likelihood of readily getting out of order. While I have illustrated and described what is at present believed to be the preferred embodiment of the present invention, it is to be undnerstood that various changes may be made in the details illustrated and described, such as fairly fall within the spirit and scope of the invention as claimed.

What I claim as new is:

1. A fifth wheel of the character described including a part adapted to be carried by a semi-trailer and provided with a depending king pin, a driven shaft on said part adapted to be operatively connected to an instrumentality on the semi-trailer to be operated, a second part adapted to be mounted on a motor tractor unit and provided with a slot open at one end for removable reception of said king pin, a coupling member on the second-named part movable into and out of engagement with said king pin for detachably coupling or uncoupling said parts, a driving shaft on said second-named part adapted to be connected with power means on the motor tractor unit, said first-named part having a raised central portion forming a gear casing, a horizontal gear journaled on the upper portion of the king pin within said gear casing, a constant driving connection between said gear and said driven shaft, said driving shaft having a pinion secured thereon and being mounted for vertical movement to permit engagement of its said pinion with or disengagement of the same from said gear, and means for vertically moving said driving shaft.

2. A fifth wheel of the character described including a part adapted to be carried by a semi-trailer and provided with a depending king pin, a driven shaft on said part adapted to be operatively connected to an instrumentality on the semi-trailer to be operated, a second part adapted to be mounted on a motor tractor unit and provided with a slot open at one end for removable reception of said king pin, a coupling member on the second-named part movable into and out of engagement with said king pin for detachably coupling or uncoupling said parts, a driving shaft on said second-named part adapted to be connected with power means on the motor tractor unit, said first-named part having a raised central portion forming a gear casing, a horizontal gear journaled on the upper portion of the king pin within said gear casing, a constant driving connection between said gear and said driven shaft, said driving shaft having a pinion secured thereon and being mounted for vertical movement to permit engagement of its said pinion with or disengagement of the same from said gear, and an operative connection between said coupling member and said driving shaft for automatically shifting the latter upwardly and engaging its pinion with said gear when said coupling member is engaged with said king pin and for lowering said driving shaft and disengaging its pinion from said gear when said coupling member is disengaged from said king pin.

3. A fifth wheel of the character described including a part adapted to be carried by a semi-trailer and provided with a depending king pin, a driven shaft on said part adapted to be operatively connected to an instrumentality on the semi-trailer to be operated, a second part adapted to be mounted on a motor tractor unit and provided with a slot open at one end for removable reception of said king pin, a coupling member on the second-named part movable into and out of engagement with said king pin for detachably coupling or uncoupling said parts, a driving shaft on said second-named part adapted to be connected with power means on the motor tractor unit, said first-named part having a raised central portion forming a gear casing, a horizontal gear journaled on the upper portion of the king pin within said gear casing, a constant driving connection between said gear and said driven shaft, said driving shaft having a pinion secured thereon and being mounted for vertical movement to permit engagement of its said pinion with or disengagement of the same from said gear, and an operative connection between said coupling member and said driving shaft for automatically shifting the latter upwardly and engaging its pinion with said gear when said coupling member is engaged with said king pin and for lowering said driving shaft and disengaging its pinion from said gear when said coupling member is disengaged from said king pin, said last-named operative connection including a bearing for the driving shaft mounted on said second-named part for vertical swinging movement and provided with a projecting pin, said coupling member being pivoted for horizontal swinging movement and having a hub provided with an inclined slot in which said pin is engaged.

4. A device of the character described, comprising a fifth wheel including a part provided with a depending king pin, and a second part provided with a slot open at one end for removable reception of said king pin, a coupling member on the second-named part movable into and out of engagement with said king pin for detachably coupling or uncoupling said parts, a driving shaft carried by one of said parts, a driven shaft carried by the other part, a driving connection between said driving shaft and said driven shaft including intermeshing gears carried by the respective parts, one of said gears having an axis of rotation coincident with the axis of said king pin, one of said gears being movable relative to the part carrying the same into and out of mesh with the other of said gears, and means for moving said movable gear relative to the part carrying the same into or out of mesh with said other gear.

5. A device of the character described comprising a fifth wheel including a part provided with a king pin and a second part provided with a slot open at one end for removable reception of said king pin, a coupling member movable into and out of engagement with said king pin for detachably coupling or uncoupling said parts, a gearing including gears carried by the respective parts and relatively movable into and out of mesh with each other independently of relative movement between said parts, one of said gears having an axis of rotation coincident with the axis of said king pin, and means for relatively moving said gears to mesh or unmesh the same when said parts are in coupling relation.

6. A device of the character described comprising a fifth wheel including a part provided with a king pin and a second part provided with a slot open at one end for removable reception of said king pin, a coupling member movable into and out of engagement with said king pin for detachably coupling or uncoupling said parts, a gearing including gears carried by the respective parts and relatively movable into and out of mesh with each other independently of relative movement between said parts, one of said gears having an axis of rotation coincident with the axis of said king pin, and means operated by said coupling member for separating said gears when the coupling member is moved to disengage it from the king pin and for connecting said gears when the coupling member is moved to engage it with said king pin.

ALBERT C. FUHRMAN.